Jan. 8, 1963  L. PÉRAS  3,072,221
DISK BRAKES
Filed April 8, 1960
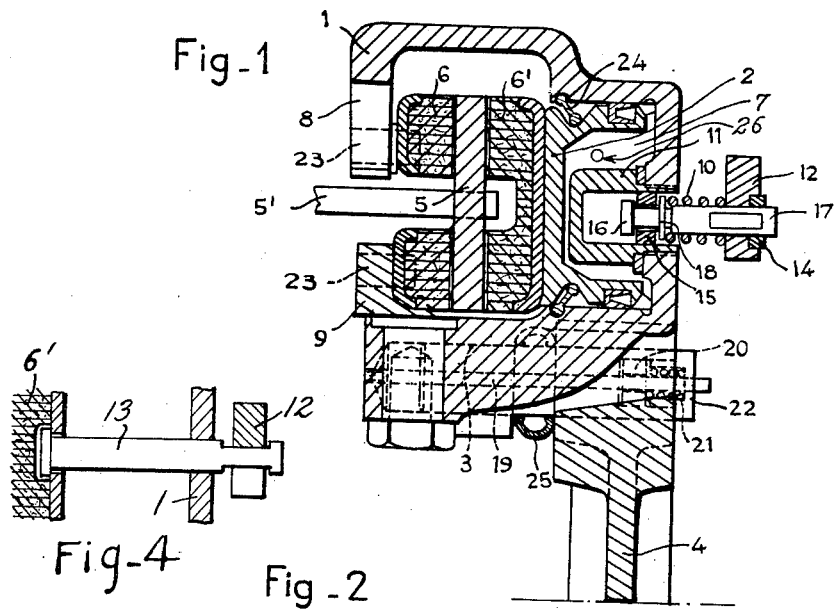
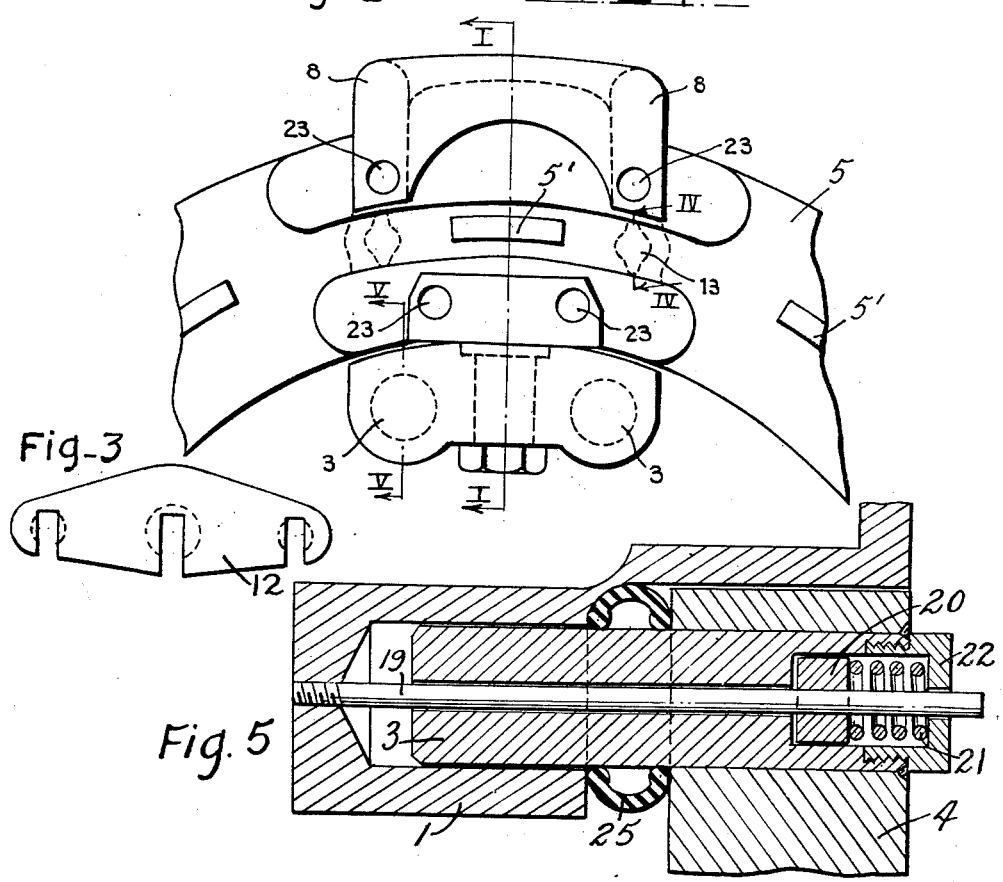

United States Patent Office

3,072,221
Patented Jan. 8, 1963

1

3,072,221
DISK BRAKES
Lucien Péras, Billancourt, France, assignor to Regie Nationale des Usines Renault, Billancourt, France
Filed Apr. 8, 1960, Ser. No. 21,011
Claims priority, application France Apr. 17, 1959
3 Claims. (Cl. 188—73)

This invention relates to improvements in disk brakes of the type comprising an annular-shaped disk secured at its intermediate circumference on a support rigid with the wheel and a pair of linings arranged above each other disposed on either side of the disk, the assembly being actuated by means of a control cylinder mounted on the side opposite to said disk support.

It is the object of this invention to provide an arrangement concerning more particularly the mounting of the brake cylinder and its operative connection with the linings, this arrangement being characterized notably by the following advantages with respect to the arrangements described in application Serial No. 742,586, filed on June 17, 1958, now Patent No. 3,027,978, issued April 3, 1962.

The number of components is reduced.

The sliding members are protected in a particularly efficient and simple manner against the ingress of water and dirt.

The clamping member can slide more freely with respect to the fixed member, due to the specific guiding arrangement in the plane of application of the braking force.

With this arrangement, the brake release action can be equally distributed among the disk faces.

The maximum radius of the assembly can be reduced so that a disk of greater diameter can be arranged in a given wheel rim.

According to this invention, the disk brake constitutes a movable member and a support member; the support member is secured on the frame and the movable member comprises a control cylinder displaceable at right angles to the disk faces by sliding on guide rods rigid with said support member, and members adapted to clamp the disk between friction linings located at close proximity to each of the disk faces.

Furthermore, in order to permit the return movement to the inoperative position after a brake application, there is provided, between the movable member and the lining located on the same side with respect to the disk, a return spring as well as members providing a certain clearance between the linings and the disk proper.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which:

FIGURE 1 is a vertical cross-section of the brake device along line 1—1 of FIG. 2;

FIGURE 2 is front view of the brake device;

FIGURE 3 is an enlarged plan view of a detail shown in cross-section in FIG. 1;

FIGURE 4 is an enlarged vertical cross-section taken along line IV—IV of FIG. 2 showing a part in two portions 90° apart.

FIG. 5 is a partial enlargement of part of FIG. 1 showing certain elements in greater detail.

Referring to the drawings and notably to FIGS. 1-4 thereof, the brake consists of a disk 5 secured on the wheel (not shown) through any suitable support provided with arms 5' on which the disk is rigidly mounted for rotation therewith. On either side of the disk are disposed sets of linings 6, 6', of which the linings 6 consist of a pair of separate elements to permit the passage of the arms 5' therebetween, the other linings 6' being formed as a unit, if desired, as shown in the drawing.

The linings 6' are acted upon by a piston 2 slidably mounted in the control cylinder 7 consisting of a bore formed in a movable member 1, the other linings 6 disposed on the side opposite to the cylinder with respect to the disk being carried along by tenon 8 and a bearing piece tenon 9 rigidly a part of the movable member 1 and on which the linings 6 are mounted by means of pins 23 respectively.

According to a specific feature of this invention, the movable member 1 is carried with a view to permit its transverse displacement with respect to a fixed support member 4 rigid with a wheel chassis, this mounting being permitted by the provision of friction guide pin 20 force fitted on rod 19 fixed to said movable member 1.

Between the movable member 1 and the linings 6' there is provided a return spring 10 bearing with one end against a yoke-shaped plate 12 connected by means of rods 13 (FIG. 4) to the lining 6', and with the other end against a friction member 15 adapted to slide with a relatively high coefficient of friction in a member 11 rigidly attached to the movable member 1. The rotation of the rod 13 through its head located behind the yoke plate 12, makes it possible to displace the rod 13 from the lining 6'. The lining 6' is therefore free from sliding laterally in view of the fact that the rods 13 maintain or support lining 6' against any circumferential feeding or driving.

According to a known method usually applied in all mechanisms of this character known as friction type play take-up devices the rod 17 constituting the central rod of spring 10 bears with one end against the plate 12 by means of a pair of split washers 14 and with the other end against a pair of abutments, one abutment 16 being rigid with the rod 17, the other abutment 18 being axially free, bearing against the friction member 15, and being engageable by a shoulder formed on the rod 17, after the latter has compressed the spring 10 to an extent equal to the required brake-release clearance. Although the mounting of the assembly comprising the movable member 1 and the piston and the brake linings is sufficiently free to permit a proper distribution of the brake release movement between the two faces of the disk, it is possible to provide in a guide rod 3 and adjustment rod 19 rigid with one end of the movable member 1, this rod being in frictional engagement with the interior of a friction guide pin 20 bearing against a spring 21 retained by a plug 22. The axial clearance permitting the release of the movable member 1 by means of a leftward movement with respect to the fixed support 4 and disk 5, should be equal to one-half of the total axial clearance which, through the medium of the rod 17 and its abutments 16 and 18, tends to move the movable member 1 to the right with respect to the disk 5.

Thus, the clearance is equally distributed on either side of the disk 5, and this clearance remains unchanged irrespective of the lining wear as explained hereinafter.

With this arrangement, worn linings can be replaced without difficulty; to this end, the plate 12 is pushed inwards, compressing the spring 10, and the lock-washer 14 is removed and the plate 12 can then be extracted.

Subsequently, the rods 13 mounted through bayonet coupling in the linings reinforcements and extending into the lining 6′ are removed therefrom and the linings are thus free to be withdrawn circumferentially from the movable member 1.

After having removed the linings 6′, the movable member 1 may be moved leftwards to release the pins 23 maintaining the other linings 6. Under these conditions, new linings can easily be fitted, the operator fitting firstly the linings 6 and then, after having moved the movable member 1 to the right, the linings 6′ secured by the rods 13, whereafter the plate 12 is replaced and locked by means of the lock washers 14.

Rubber or like packings or seals 24, 25 are provided to protect the sliding joints against the ingress of foreign substances.

This brake operates as follows:

During a brake application, a hydraulic pressure is directed through a line (not shown) and an orifice 26 in the space provided in the control cylinder 7 between the piston and the bottom of the bore, this pressure causing on the one hand the piston 2 to press the lining 6′ against the disk 5 and on the other hand the movable member 1 to move and therefore through the tenons 8 and 9 to press the lining 6 against the disk 5. Thus, the spring 10 is compressed between the plate 12 and the abutment 18, the plate 12 having followed the forward movement of the lining 6′ to the left by means of the rods 13 and the movable member 1 having moved to the right.

When, as a consequence of lining wear, the shoulder of rod 17 engages and carries along the abutment 18, the latter pushes the friction member 15 engaged thereby inside its recess member 11, this sliding movement being somewhat counteracted, as already explained, by the relatively high coefficient of friction existing between the members 15 and 11. Thus, as the brake linings wear out the member 15 extends further into the recess of member 11 and causes the plate 12 to approach the member 1.

Upon release of the hydraulic pressure, the spring 10 restores the normal relative spacing between the movable member 1 and the plate 12 and, therefore, between the brake linings. However, the clearance provided between the friction member 15 and the abutments 16 and 18 surrounding same and mounted on the rod 17 carrying the spring 10 corresponds to the clearance available between the disk 5 and its linings 6 and 6′ which is thus constant, irrespective of the degree of wear, the wear being therefore equally distributed among the two linings 6 and 6′ on either side of the disk 5. The play limitation is assisted by the rods 19 which, as the movable element 1 moves, carry along the guide pin 20 against the resistance of the spring, and which, when this backward movement exceeds a normal value, slide within the guide pin 20 while overcoming a certain frictional resistance.

I claim:

1. On a wheel mounted for rotation on a chassis, an improved disk brake for use in stopping the rotating wheel and comprising in combination: an annular disk having oppositely disposed faces and inner and outer circumferences; a plurality of arms spaced around and rigidly attached to one of said oppositely disposed disk faces intermediate said circumferences and to said wheel for supporting said disk for rotation therewith about an axis of rotation; a support member rigidly secured to said chassis; stationary guide rods mounted in said support member parallel to said axis of rotation; a movable member slidably mounted on said guide rods and only movable thereon normal to said disk faces, said movable member defining a recess through which a portion of said disk rotates, and a cylinder bore facing the other of said oppositely disposed disk faces and congruent with said recess; a piston slidably mounted in said cylinder bore; frictional linings disposed in said recess and axially spaced from said disk faces, one of said linings being opposed to said other disk face, and two other linings being opposed to said one disk face, said other linings being respectively arranged radially on opposite sides of each of said plurality of arms, and said other linings being secured to said movable member and movable therewith to engage said one disk face and said one lining being movable by said piston to engage said other disk face; supporting means for said one lining including play-take-up means, said supporting means comprising a yoke mounted on said movable member, transverse said axis of rotation and support rods fastened to said yoke and to said one lining parallel to said axis of rotation, said yoke and rods thereby supporting said one lining against movement around said axis of rotation and for movement by said piston parallel to said axis of rotation; a first return spring mounted between said movable member and said supporting means and a second return spring mounted between said support member and said movable member, said return springs for biasing said linings clear of said disk; whereby a pressure applied to in said cylinder bore moves said piston and movable member and their respectively associated linings into frictional engagement with the oppositely disposed faces of said annular disk to stop any rotation of said disk and attached wheel about said axis of rotation, and releasing said pressure releases said linings from said engagement.

2. An improved disk brake as described in claim 1 characterized in that said supporting means includes a play take-up device comprising: a center rod intermediate the support rods rigidly connected at one end to said yoke, said center rod having a pair of circumferential abutments spaced an axial distance apart at the other end; a friction element slidably mounted between said abutments and extending axially for less than the distance said abutments are spaced apart, the difference in the distances between said spaced abutments and said friction element being equal to the sum of the distance between both said linings and said disk faces, and said center rod mounting said first return spring between said yoke and said abutment nearest thereto; a member defining a recess extending into said cylinder bore, said friction element being slidably positioned with a relatively high friction in said recess, said friction being less than the pressure applied in said cylinder bore, whereby as said linings wear the friction element is advanced in the recess to advance said yoke and connected support rods thereby compensating for wear and keeping the linings spaced from the disk a constant distance as provided by said difference between the axial extent of said friction element and the axial distance between abutments.

3. An improved disk brake as described in claim 2 characterized in that a second play take-up device is provided in cooperation with said support member and comprising a hollow guide rod, having an enlarged recess extending axially in one end, rigidly attached to said support member; an adjustment rod slidably and concentrically mounted in said guide rod and having an end secured to said movable member; a friction guide pin mounted in said recess, the other end of said adjustment rod being frictionally engaged thereby, said friction guide pin extending axially less than said recess, the difference in axial extent being equal to half the sum of the distances between said linings and said disk faces; said second return spring mounted in said recess and bearing against said friction guide pin; a plug means for closing said recess and retaining said spring therein to bias said adjustment rod and frictionally engaged friction guide pin, the friction between said adjustment rod and said friction guide pin being less than pressure applied in said cylinder bore, whereby as said pair of linings supported by said movable member wear, the adjustment rod is advanced in said friction guide pin to advance said movable member and supported linings thereby compensating for wear and keeping the pair of linings spaced from said one disk face a constant distance as provided by the axial difference in extent between said recess and said friction guide pin.

References Cited in the file of this patent

UNITED STATES PATENTS

| | | |
|---|---|---|
| 2,351,041 | Hawley | June 13, 1944 |
| 2,531,341 | Meador | Nov. 21, 1950 |
| 2,575,578 | Bricker | Nov. 20, 1951 |
| 2,784,811 | Butler | Mar. 12, 1957 |

FOREIGN PATENTS

| | | |
|---|---|---|
| 1,180,475 | France | Dec. 29, 1958 |